(12) United States Patent
Jakobsson (10) Patent No.: US 6,970,839 B2
(45) Date of Patent: Nov. 29, 2005

(54) METHOD, APPARATUS, AND ARTICLE OF MANUFACTURE FOR GENERATING SECURE RECOMMENDATIONS FROM MARKET-BASED FINANCIAL INSTRUMENT PRICES

(75) Inventor: Bjorn Markus Jakobsson, Hoboken, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 724 days.

(21) Appl. No.: 09/809,953

(22) Filed: Mar. 16, 2001

(65) Prior Publication Data

US 2002/0133419 A1 Sep. 19, 2002

(51) Int. Cl.[7] .............................................. G06F 17/60
(52) U.S. Cl. .................................................... 705/26
(58) Field of Search ..................................... 705/26, 27

(56) References Cited

U.S. PATENT DOCUMENTS

| | | | | |
|---|---|---|---|---|
| 5,608,620 A | * | 3/1997 | Lundgren ........................ | 705/1 |
| 5,946,666 A | * | 8/1999 | Nevo et al. .................... | 705/36 |
| 6,236,980 B1 | * | 5/2001 | Reese ............................ | 705/36 |
| 6,338,067 B1 | * | 1/2002 | Baker et al. ................. | 707/100 |
| 6,606,615 B1 | * | 8/2003 | Jennings et al. .............. | 706/45 |
| 6,618,707 B1 | * | 9/2003 | Gary ............................. | 705/37 |
| 2002/0095305 A1 | * | 7/2002 | Gakidis et al. ................ | 705/1 |

FOREIGN PATENT DOCUMENTS

NL  1002790 C6 *  5/1997 ........... G06F/19/00

OTHER PUBLICATIONS

Gulati, Anil: "Decision support in commodities investment: An expert system application"; Industrial Management + Data Systems; v94, i1, p23(5); 1994.*

* cited by examiner

*Primary Examiner*—Jeffrey A. Smith (57) ABSTRACT

Techniques for generating a recommendation for one or more sources of goods or services in an information processing system are disclosed. A given recommendation is generated by first determining prices of futures, futures options or other financial instruments characterizing opinions regarding multiple sources of goods or services. Each of the financial instruments is associated with a corresponding one of the sources and indicates one or more bets placed regarding performance of that source. The recommendation is then generated for at least a particular one of sources of goods or services based at least in part on a comparison of the determined price associated with the particular one of the sources of goods or services with one or more of the determined prices associated with others of the plurality of sources of goods or services. The recommendation may be in the form of a ranking of the multiple sources in terms of a particular aspect of performance associated with the corresponding financial instruments.

15 Claims, 8 Drawing Sheets

METHOD, APPARATUS, AND ARTICLE OF MANUFACTURE FOR GENERATING SECURE RECOMMENDATIONS FROM MARKET-BASED FINANCIAL INSTRUMENT PRICES

FIELD OF THE INVENTION

The invention relates generally to information processing systems implemented over the Internet or other communication networks, and more particularly to techniques for generating secure recommendations relating to goods or services for users in such systems.

BACKGROUND OF THE INVENTION

Existing techniques for providing recommendations for goods and services to users over the Internet or other communication networks are deficient in that such techniques are subject to fraudulent manipulation, can require a large amount of overhead, and often fail to consider sufficiently wide range of sources of the goods and services.

These existing techniques include, by way of example, on-line vendor rating services implemented by public service organizations such as the Better Business Bureau, buyer and seller ratings available via auction web sites such as eBay, and customer reviews on merchandise web sites such as Amazon. Fraudulent manipulation in these and other techniques can arise when users submit input such as complaints, ratings, reviews, etc. that are incorrect, biased or otherwise misrepresented. Excessive overhead will generally result if a web site or other entity that generates the recommendations is required to verify the accuracy of the above-noted user inputs, and such overhead increases dramatically with the number of sources considered.

It is therefore apparent that for these conventional techniques there is a direct relationship between the cost of producing a recommendation, and the accuracy and timeliness of that recommendation.

A related difficulty is that the conventional techniques, in order to produce a sufficiently accurate and timely recommendation, may require an excessive amount of computational resources, and therefore may not be readily implemented in electronic commerce applications involving mobile telephones, personal digital assistants (PDAs), handheld computers or other mobile information processing devices.

A need therefore exists for improved techniques for generating secure recommendations over the Internet or other communication networks. Such techniques should preferably utilize minimal amounts of computational resources and other overhead, and should be adaptable for efficient implementation in conjunction with mobile information processing devices.

SUMMARY OF THE INVENTION

The present invention provides methods and apparatus for generating secure recommendations for users over the Internet or other communication networks. In accordance with one aspect of the invention, the secure recommendations are based on market prices for futures, futures options or other financial instruments that characterize opinions of particular sources of goods or services. The prices of the financial instruments are established in accordance with a market for the financial instruments that is based on inputs from investors placing bets regarding performance of the sources.

More particularly, a given recommendation is generated by first determining prices of futures, futures options or other financial instruments characterizing investor opinions regarding multiple sources of goods or services. Each of the financial instruments is associated with a corresponding one of the sources and indicates one or more bets that may be placed regarding performance of that source. The recommendation is then generated for at least a particular one of sources of goods or services based at least in part on a comparison of the determined price associated with the particular one of the sources of goods or services with one or more of the determined prices associated with other sources of goods or services. The recommendation may be in the form of a ranking of the multiple sources in terms of a particular aspect of performance associated with the corresponding financial instruments, e.g., a ranking of at least a subset of the sources from a best one of the subset of the sources to a worst one of the subset of sources. There may be associated with the recommendation a certainty indicator specifying the strength of the recommendation based on degree of difference between the determined price of a financial instrument associated with particular one of the sources and determined prices of financial instruments associated with one or more of the other sources.

In accordance with another aspect of the invention, the sources of goods or services may be organized into different classes, with each of the classes including one or more subclasses. A user request for the recommendation may include a designation of a class of the sources and at least one subclass of the designated class. Alternatively, the user request may include a designation of only the class of the sources, in which case the system may automatically determine each of the subclasses associated with the designated class. The system then determines prices of the financial instruments for each of the subclasses, and generates the recommendation in the form of a ranking of the sources for each of the subclasses.

In accordance with a further aspect of the invention, a user request for the recommendation may include designation of a class of the sources, and the user may rank subclasses associated with the designated class in order of importance. The system may then automatically assign weights to each of the subclasses based on the user rankings. Prices of financial instruments are then determined for each of the subclasses, the prices are weighted using the assigned weights, the weighted prices are summed for each of the subclasses, and the recommendation is presented to the user in the form of a ranking of the sources based on the sums of the weighted prices.

Advantageously, the invention may be configured such that the cost to an attacker of introducing bias in the recommendation system exceeds the cost of improving the goods or services, such that the secure recommendations generated in accordance with the invention are essentially abuse-free, and thus secure, recommendations.

DETAILED DESCRIPTION OF THE INVENTION

The present invention will be illustrated below in conjunction with an information processing system in which the secure recommendation techniques of the invention are implemented over the Internet or other type of network or communication channel. It should be understood, however, that the invention is more generally applicable to any type of electronic system or device application in which it is desirable to provide secure recommendations to users. For example, although particularly well suited for use with computer communications over the Internet or other computer networks, the invention can also be applied to numerous other information processing applications, including applications involving information transmission over wireless networks using wireless devices such as mobile telephones or personal digital assistants (PDAs).

Figure 1:
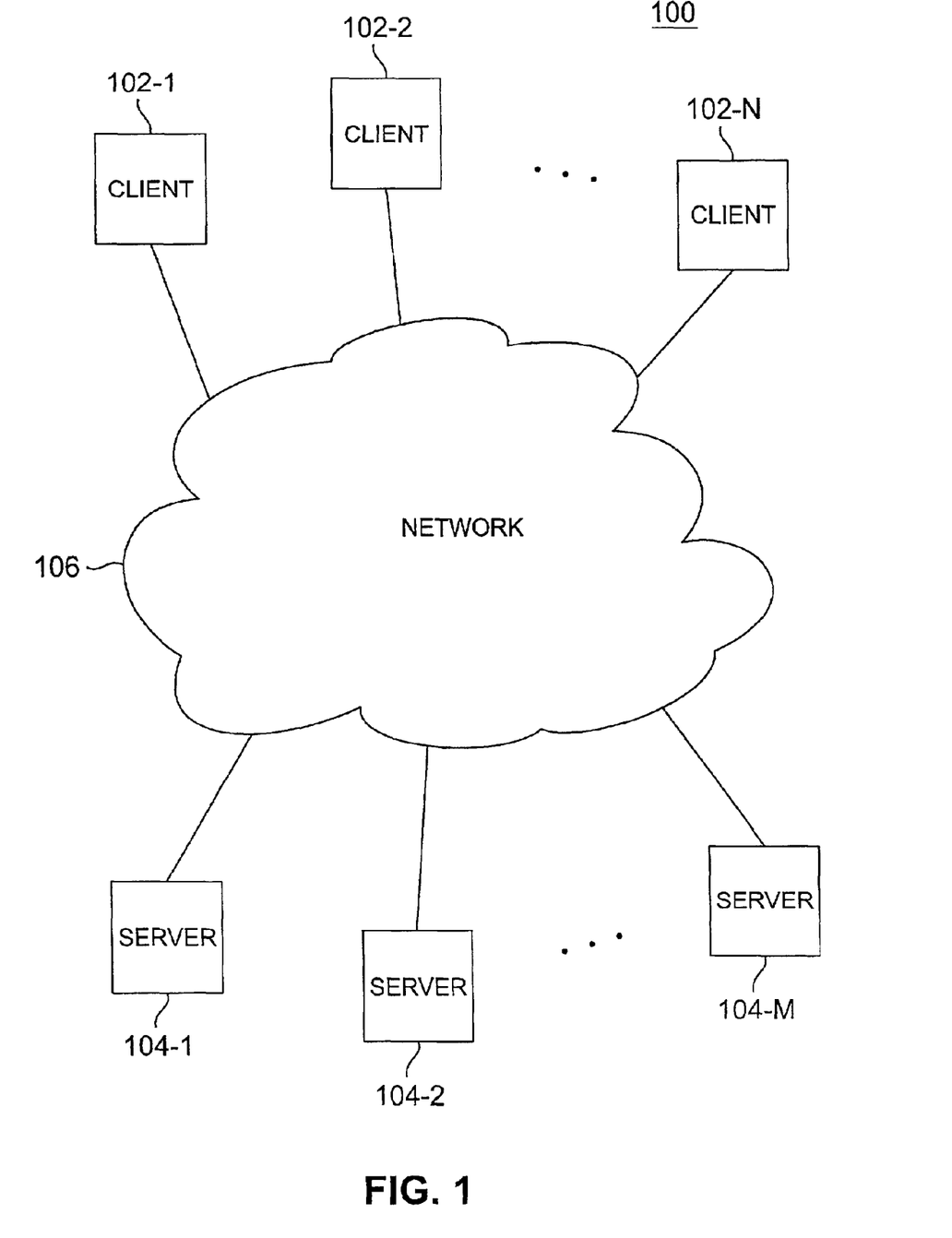
FIG. 1 shows an illustrative embodiment of an information processing system in which the present invention is implemented.

FIG. 1 shows an exemplary system 100 in which the secure recommendation techniques of the invention are implemented. The system 100 includes a number of client devices 102 which communicate via servers 104 of a network 106. More particularly, the system 100 as shown includes N client devices 102-i, i=1, 2, ... N, and M servers 104-j, j=1, 2, ... M, each coupled to the network 106.

The client devices 102 may be desktop or portable personal computers, mobile telephones, PDAs, television set-top boxes or any other types of devices capable of transmitting or receiving information over network 106.

The term "computer" as used herein is intended to be construed generally so as to include any of the above-noted client devices, any of the servers, or combinations of one or more of the client devices and one or more of the servers.

The network 106 may be a local area network, a metropolitan area network, a wide area network, a global data communications network such as the Internet, a private "intranet" network, an "ad-hoc" network or any other suitable data communication medium, as well as portions or combinations of such networks or other communication media.

It should be understood that although particular arrangements of client devices 102 and servers 104 are shown in the FIG. 1 embodiment, the invention is more generally applicable to any number, type and arrangement of different client devices and servers.

Figure 2:
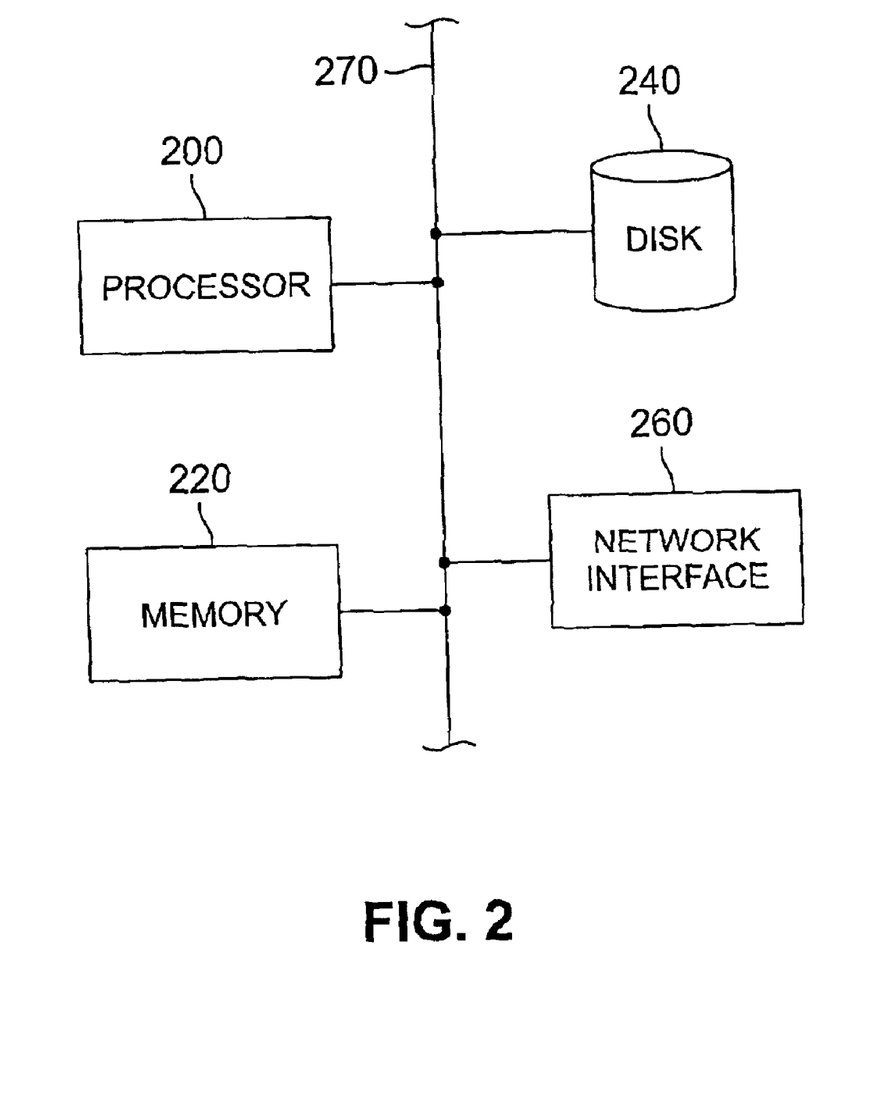
FIG. 2 is a block diagram of one possible implementation of a given one of the elements of the system of FIG. 1.

FIG. 2 shows one possible implementation of a given one of the client devices 102 or servers 104 of system 100. The implementation in FIG. 2 may thus represent one or more of the elements 102 and 104, as well as portions of these elements. This implementation includes a processor 200, an electronic memory 220, a disk-based memory 240, and a network interface 260, all of which communicate over a bus 270. One or more of the processing elements of system 100 may thus be implemented as a personal computer, a mainframe computer, a computer workstation, a smart card in conjunction with a card reader, or any other type of digital data processor as well as various portions or combinations thereof. The processor 200 may represent a microprocessor, a central processing unit, a digital signal processor, an application-specific integrated circuit (ASIC), or other suitable processing circuitry. It should be emphasized that the implementation shown in FIG. 2 is simplified for clarity of illustration, and may include additional elements not shown in the figure. In addition, other arrangements of processing elements may be used to implement one or more of the elements of the system 100.

The elements 102 and 104 of system 100 execute software programs in accordance with the invention in order to generate and process secure recommendations in a manner to be described in detail below. The invention may be embodied in whole or in part in one or more software programs stored in one or more of the element memories, or in one or more programs stored on other machine-readable media associated with one or more of the elements of the system 100.

The present invention in an illustrative embodiment utilizes futures, futures options or other financial instruments to generate secure recommendations for sources of goods or services. In the system of FIG. 1, these recommendations may be generated by cooperative interaction between at least a subset of the client devices 102 and at least a subset of the servers 104, as will be described in detail below. The recommendations are based on a current market value established for user opinions on designated aspects of particular sources of goods or services. The current market value of the user opinions in the illustrative embodiments is determined by the value of futures, futures options or a suitable combination of futures and futures options. The term "source of goods or services" as used herein is intended to include a source of any type of product, device or other goods, a source of any type of service, or a source of both goods and services.

Unlike conventional futures, which typically characterize prices of commodities, futures used in the present invention characterize user opinions of particular sources or goods or services. In accordance with the invention, any measurable error in the accuracy or timeliness of a given recommendation represents a financial opportunity for one discovering this fact. As a result, recommendations will tend to be both accurate and timely.

Conventional futures are contractual promises to buy or sell a certain quantity of a commodity at a given time. Futures can be characterized as either "long" or "short." To be long means to have agreed to obtain delivery at a specified price and time, while being short means to have agreed to make delivery at a specified price and time. In either case, the price is agreed upon at the time the contract is made.

A conventional futures option is a contract that gives its holder the possibility of buying (in the case of a "call" option) or selling (in the case of a "put" option) a quantity of a commodity at a specified price and time. Unlike a future, a futures option does not require the holder to obtain delivery or make delivery at the specified price and time. The delivery time of a futures option instead represents the last point in time at which the holder may exercise the option to buy or sell the quantity of the commodity at the specified price. Like futures, futures options can also be characterized as long or short. The price of the futures option is related to the anticipated price developments of the underlying commodity. Thus, in a bullish market for the underlying commodity, the price of a long futures option is going to be high, and the price of a corresponding short position is going to be low.

As noted above, the futures and futures options utilized in conjunction with the present invention differ from conventional futures and futures options in that the former are indicative of user opinions of particular sources of goods or services. For example, when the sources are companies, the relationship between the opinion futures and futures options prices associated with the companies will specify an accurate and timely recommendation in the form of a preference ranking of the companies. More particularly, if a user believes that a certain source is improving, then he or she will take a long position for that source. Should he or she be right, then other users will follow, and the price will increase, giving the original user a profit. Similarly, if the user believes that a source is becoming worse, he will take a short position for that source.

In accordance with one aspect of the invention, all sources that are in a particular class, e.g., are determined to be sufficiently comparable by one designing or configuring the system software, may be ordered with respect to prices of their futures or futures options. More particularly, the highest price corresponds to the highest ranking, the second highest price to the second highest ranking, and so on. It can be shown that financial arbitrage will automatically cause a linear ordering of all of the source being compared. Such an ordering may be generated with respect to each aspect, e.g., quality, value, service, of a given source of goods or service, as long as there is a corresponding future, futures option or other similar financial instrument corresponding to that aspect. These aspects are also referred to herein as "subclasses," as will be described in greater detail in conjunction with FIGS. 6A, 6B and 7 below.

The futures or futures options in the illustrative embodiment of FIG. 1 may be purchased by a given user via a user interface provided at a corresponding one of the client devices 102. Such an interface is implemented in software, and may be part of a browser or other application program running on, downloaded to or otherwise implemented on the client device. A user that purchases a future or futures option is also referred to herein as an "investor." It should be noted that an investor is not required to have actual knowledge of the performance of a particular source of goods or services, or to belong to any particular demographic group, in order to make a purchase.

The market prices for the futures or futures options in the illustrative embodiment may be established using software running on one or more of the servers 104, based on inputs received from the client devices 102. The price-setting process may also involve using techniques similar to those currently used to establish prices for conventional futures and futures options. Such techniques are well known and therefore not described in detail herein.

Figure 3A:
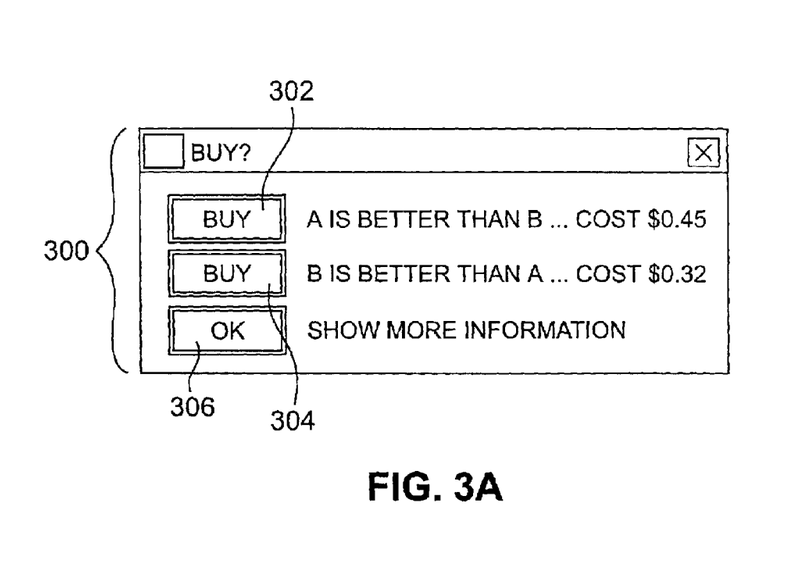
FIGS. 3A and 3B show portions of a recommendation interface in accordance with the invention.

FIG. 3A shows a portion of an example of the above-noted user interface. The portion shown in the figure includes a window 300 having a number of buttons 302, 304 and 306 associated therewith. The buttons can be activated via a point-and-click device such as a mouse or electronic pen, or via other known mechanisms. In this example, buttons 302 and 304 when activated each allow the user to purchase a particular future. More specifically, as shown in the figure, activation of the button 302 allows the user to purchase a future corresponding to a bet that a particular source A is better than another source B (i.e., a "long A, short B" bet). The price of this future is identified as $0.45 in the figure. Similarly, activation of the button 304 allows the user to purchase a future corresponding to a bet that source B is better than source A (i.e., a "short A, long B" bet), at a cost of $0.32. Activation of button 306 from the window 300 directs the interface to show additional information to the user.

It should be noted that any user who wants to invest in the opinion futures or futures options will generally need to first open an account, and transfer money to a clearinghouse or a broker. A variety of well understood methods can be used for this, as well as for protecting the account against unauthorized access. Once an account has been created and a minimum balance established, the user can trade in available futures and futures options.

Figure 3B:
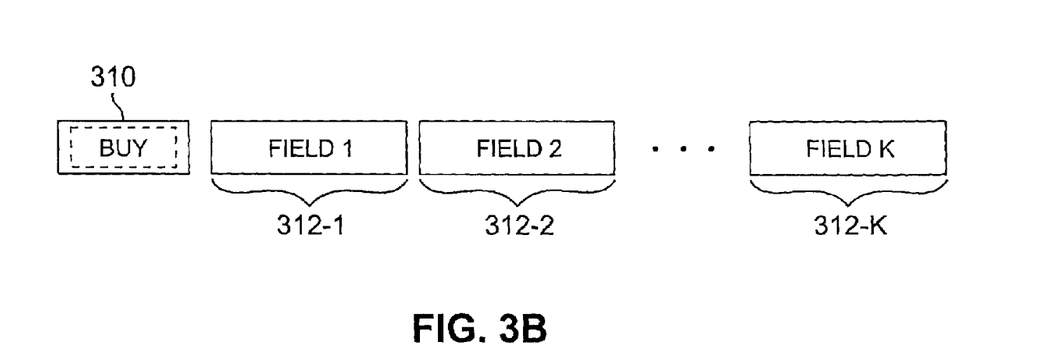

The portion of the interface shown in FIG. 3A is an example only, and numerous other arrangements are possible. FIG. 3B shows a more complex arrangement in which associated with a button 310 are a number of fields 312-1, 312-2, . . . 312-K. Activation of the button 310 allows the user to purchase a corresponding future or futures option. The fields 312-1, 312-2, . . . 312-K information describing the future or futures option. For example, field 312-1 may include a description of the future or futures option, such as that shown opposite buttons 302 and 304 in the FIG. 3A example, while the additional fields may include information such as a price history chart, transaction volume for a designated time period, open interest, etc.

As is well known, open interest and transaction volume can provide insight into the relative price strength of futures and futures options, and can thus be used to indicate the precision of a recommendation generated in accordance with the invention.

In addition, information such as transaction volume and open interest may be expressed in terms of a percentage of a total number for all sources of the goods or services associated with the corresponding future or futures option. The particular types of information displayed in the various fields may be selected by the user in accordance with user preferences.

Figure 4A:
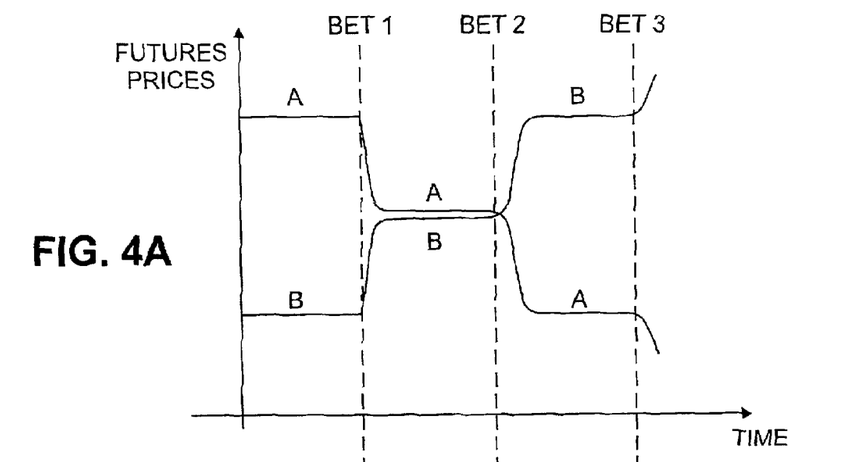
FIGS. 4A, 4B and 4C illustrate the manner in which recommendations can vary in accordance with futures prices for sources of goods or services in an illustrative embodiment of the invention.
Figure 4B:
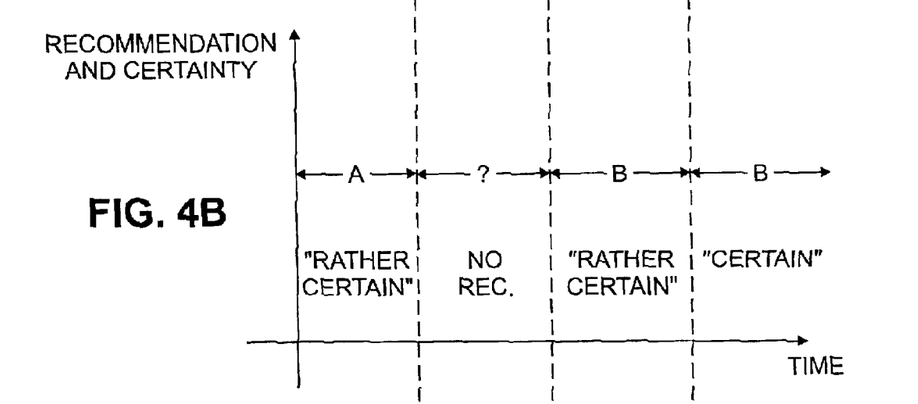
Figure 4C:
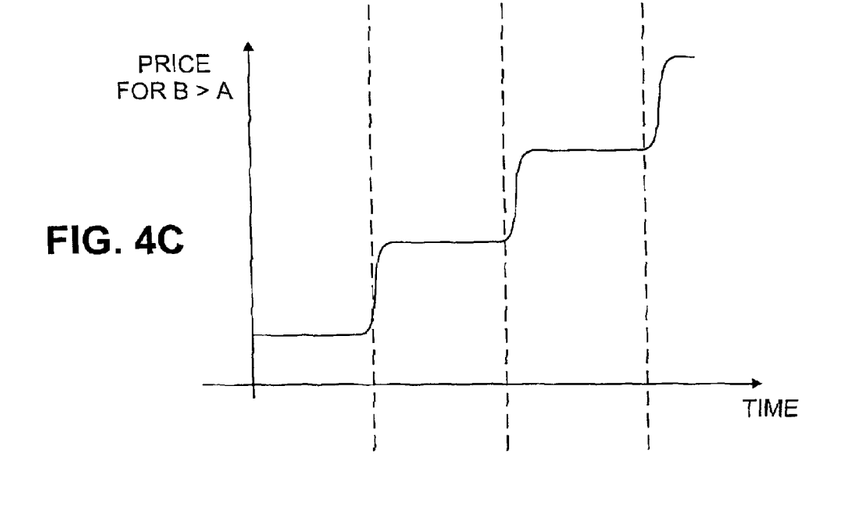

FIGS. 4A, 4B and 4C illustrate the impact on futures prices and corresponding recommendations in response to particular futures purchases by users in system 1 via a user interface of the type described in conjunction with FIGS. 3A and 3B. As indicated above, such purchases are also referred to herein as "bets." In the example of FIGS. 4A, 4B and 4C, it is assumed that three such bets (Bet 1, Bet 2 and Bet 3) are placed one after another as shown in the figures, with each corresponding to a "B is better than A" bet (i.e., a "short A, long B" bet) such as that initiated by activation of button 304 in the FIG. 3A user interface. FIG. 4C shows the price of the "B is better than A" bet as a function of time.

Prior to placement of the bets, the futures price associated with A is substantially greater than that associated with B, as shown in FIG. 4A. This relationship between the futures process associated with sources A and B results in a recommendation of A as the source for the designated goods or services as shown in FIG. 4B.

A level of certainty may be associated with the recommendation, also as shown in FIG. 4B, based on the difference between the futures price for an "A is better than B" bet (i.e., a "long A, short B" bet) and the "B is better than A" bet. For the recommendation of A prior to placement of Bet 1, the certainty is denoted as "rather certain."

After placement of Bet 1, which as noted above is the first in a series of three "B is better than A" bets in this example, the futures price associated with A drops while the futures price associated with B rises. As a result, the futures prices converge, such that after placement of Bet 1 but before placement of Bet 2 the prices are too close to produce any recommendation. Following placement of Bet 2, the futures price associated with B again increases while that of A drops, leading to a "rather certain" recommendation of source B. After placement of Bet 3, a further increase of the futures price associated with B coupled with a further decrease in that of A leads to a "certain" recommendation of source B as indicated in FIG. 4B.

It is apparent from the example of FIGS. 4A, 4B and 4C that purchases of opinion futures by users of the system of FIG. 1 can alter the futures prices and thus the secure recommendations generated from those futures prices.

Figure 5:
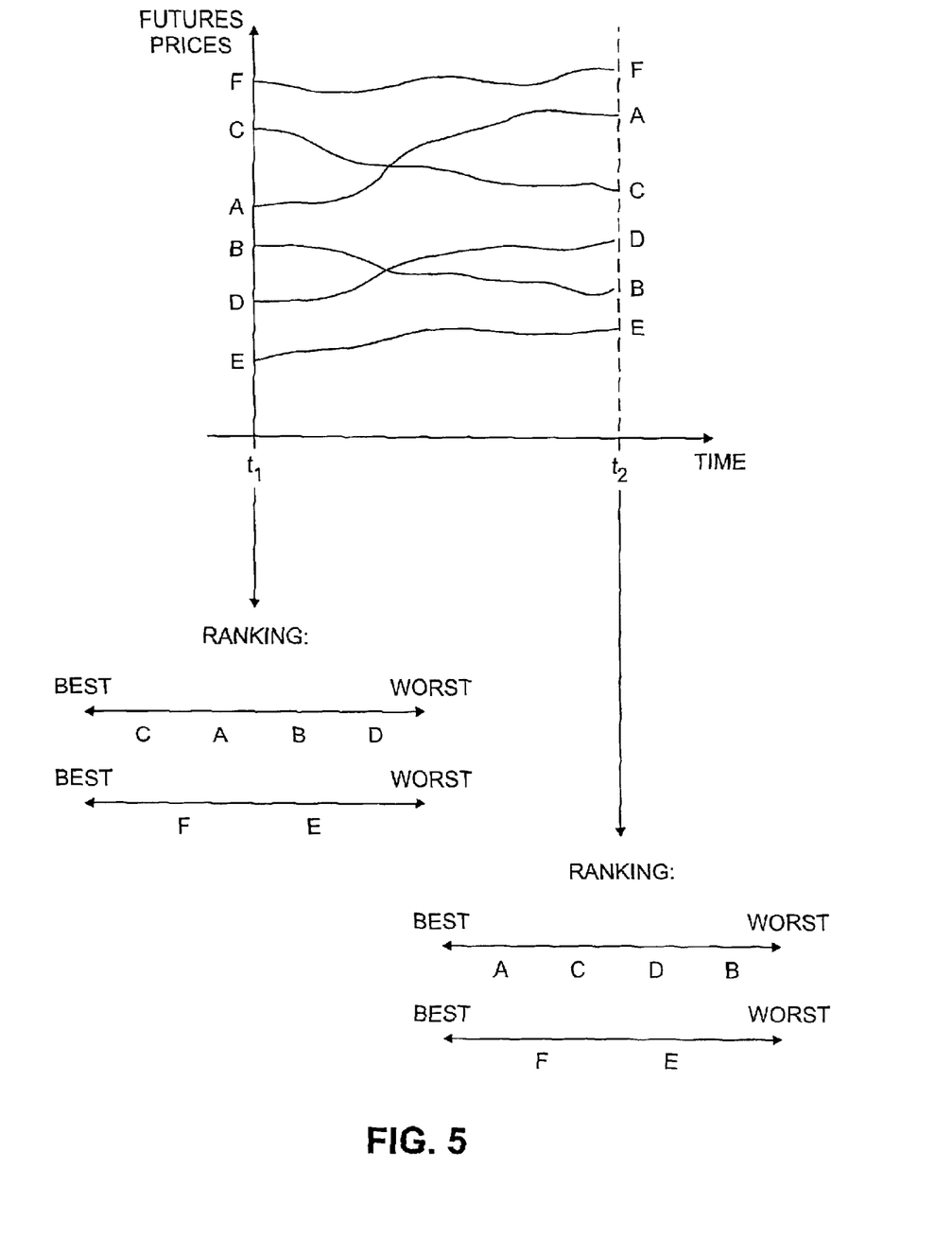
FIG. 5 illustrates example rankings of sources of goods and services in an illustrative embodiment of the invention.

FIG. 5 shows another example of the manner in which recommendations can be generated from futures prices in accordance with the techniques of the invention. In this example, A, B, C and D are in one class of sources of designated goods or services, while E and F are in another class of sources of the designated goods or services. The futures prices at time $t_1$, result in two sets of rankings as shown, one for each of the classes. At time $t_1$, the futures prices indicate that the rankings of the sources in the two classes, from best to worst, are C A B D and F E, respectively. These rankings serve as secure recommendations that may be provided to system users, e.g., via user interfaces of the client devices 102. Variations in the futures prices between time $t_1$, and time $t_2$ leads to a new set of rankings at time $t_2$, as shown in the figure. More particularly, the futures prices at time $t_2$ indicate that the rankings of the sources in the two classes, from best to worst, are A C D B and F E, respectively.

Presentation of secure recommendations to users may therefore be in the form of a graphical display or other user-perceptible presentation of rankings such as those shown in FIG. 5. Such a display may be generated by software running on a given one of the client devices based on futures prices or rankings delivered over the network 106 from one or more of the servers 104.

Figure 6A:
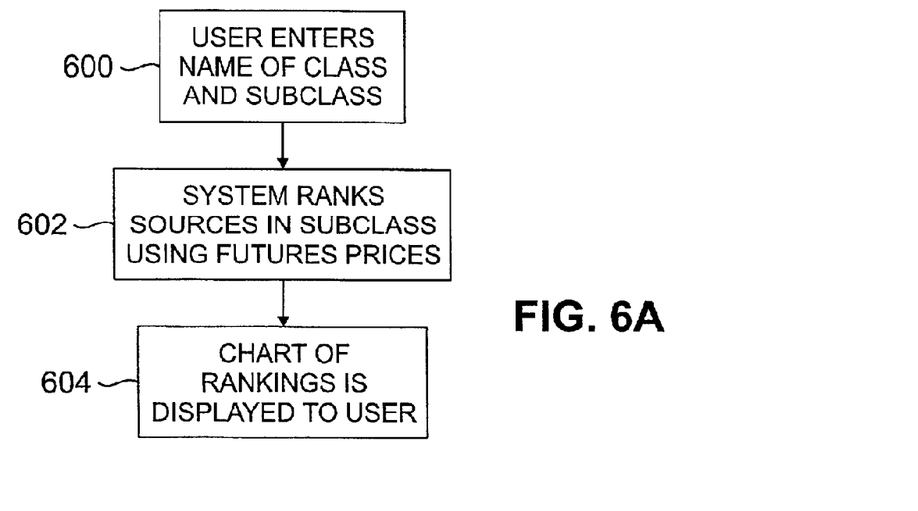
FIGS. 6A and 6B are flow diagrams illustrating the operation of example recommendation interfaces in accordance with the invention.
Figure 6B:
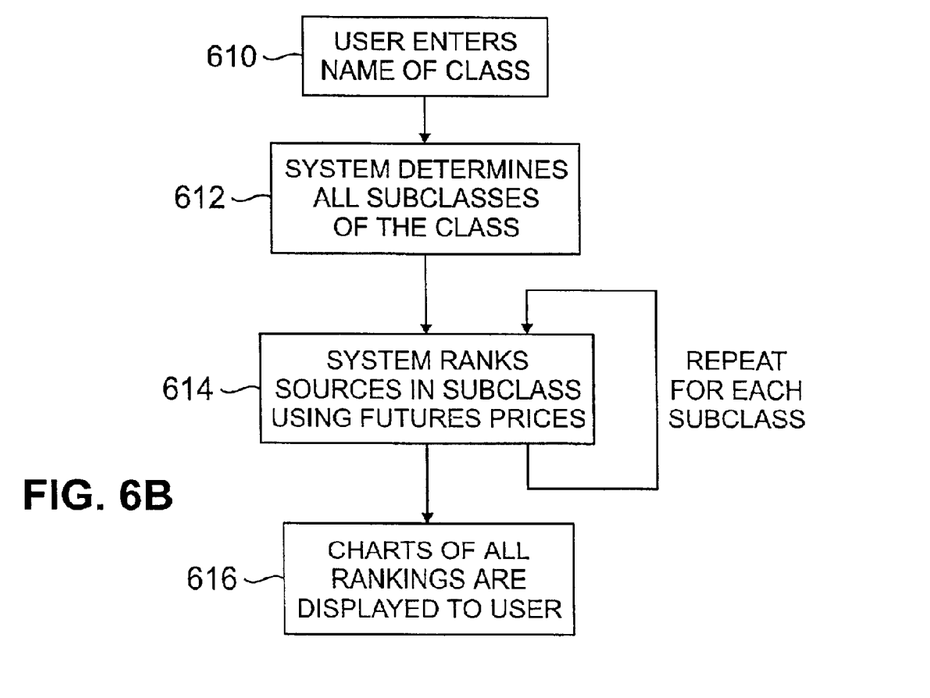

FIGS. 6A and 6B are flow diagrams further illustrating the manner in which secure recommendations can be generated in the system of FIG. 1. For this embodiment, it is assumed that sources of goods and services are grouped into classes and subclasses. A class may refer to a particular type of goods or services, e.g., "digital cameras," while a subclass refers to a particular characteristic for which the sources are ranked based on corresponding futures prices, e.g., "value for money." Other subclasses may include different demographic perspectives, e.g., "as perceived by men between the ages of 20 and 25," or "as perceived by teenage girls." Numerous other types of subclasses will be apparent to those skilled in the art. As noted previously, an investor in a future or futures options in accordance with the invention need not be a member of any such demographic group. Instead, the investor need only believe that they know what people in a given subclass will like. The classes and subclasses are thus used as labels, and do not limit in any way the manner in which futures or futures options investments can be made within the system.

Referring to FIG. 6A, a user in step 600 enters the name of a particular class and subclass. This may be achieved through interaction with a user interface of the type previously described. In step 602, the system ranks the sources in the subclass based on the corresponding futures prices. For example, an application program running on one of the client devices 102 may request futures prices or rankings from one or more servers 104 of the system 100. The actual generation of the rankings may thus be done in the client device, one or more of the servers, or through appropriate interaction between the client device and one or more of the servers. In step 604, a chart of the rankings for the selected class and subclass is displayed to the user, e.g., via a display associated with the client device. Other presentation mechanisms can also be used, e.g., the rankings can be presented in an audio format over a mobile telephone.

In the process illustrated by the flow diagram of FIG. 6B, a user need not specify a particular subclass. The user in step 610 enters the name of a class, and in step 612 the system determines all of the subclasses of the selected class. This determination and other operations referred to herein as being performed by the system may be implemented in the client device, in one or more of the servers, or via interaction between the client device and one or more of the servers. In step 614, the system ranks the sources of a given one of the subclasses using futures prices. The generation of rankings is repeated for each of the subclasses previously identified in step 612. Step 616 generates a display of rankings charts for all of the subclasses.

Figure 7:
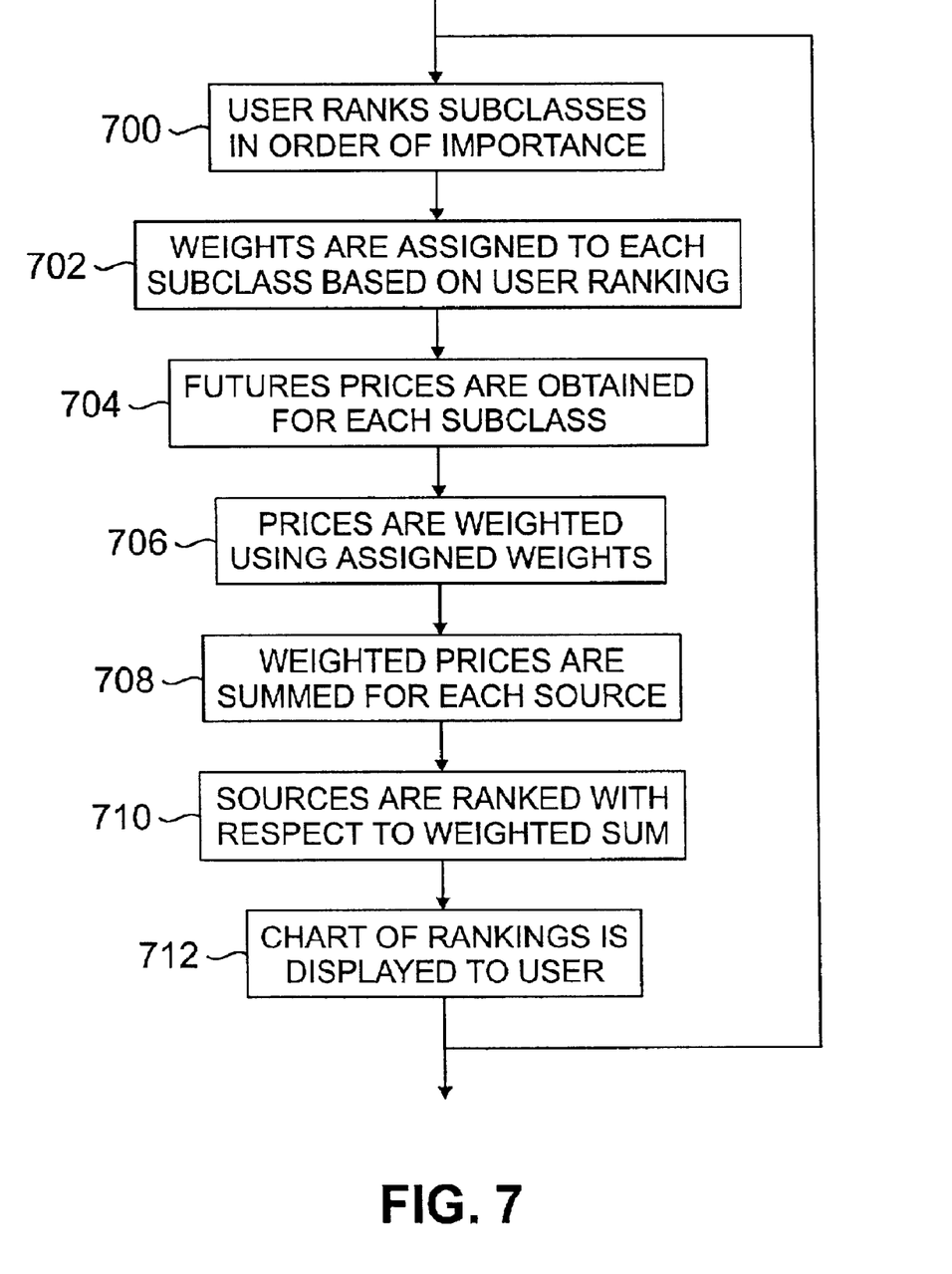
FIG. 7 is a flow diagram of an example secure recommendation generation process in accordance with the invention.

FIG. 7 shows a flow diagram of an exemplary decision guide that may be implemented in the system of FIG. 1 in accordance with the invention. As in the previously-described embodiments, the operations shown in FIG. 7 are performed either in a given one of the client devices 102, in one or more of the servers 104, or via interaction between the client device and one or more of the servers conducted over the network 106.

In step 700 of FIG. 7, a given user ranks the subclasses associated with a particular class of interest in order of importance. For example, the given user may feel that a subclass "customer service performance" or a subclass "product reliability" is more or less important than a "value for money" subclass for the above-noted "digital cameras" class. Step 702 then assigns weights to each of the subclasses based on the user rankings. The futures prices for each of the sources in the various subclasses are then obtained in step 704, e.g., in response to a request generated by the client device and delivered to one or more of the servers over the network. The futures prices so obtained are then weighted in step 706 using the weights assigned in step 702. The weighted prices are summed for each of the sources in step 708, and the sources are then ranked in accordance with the resulting weighted sums, as indicated in step 710. A chart of the resulting rankings is then displayed to the user in step 712. Again, other types of presentations of the resulting rankings can be made, e.g., audibly rather than visually perceptible presentations may be generated.

It should also be noted that the recommendations need not be in the form of strict numerical rankings, but could instead be in the form of an identification of one particular source as a best source, an identification of a group of sources meeting some minimum recommendation threshold, etc.

Although the embodiments described in conjunction with FIGS. 3 through 7 refer to futures prices, it should be appreciated that similar embodiments may be implemented using futures options, combinations of futures and futures options, or other financial instruments.

In the above embodiments dealing with user opinion futures and futures options, there is no commodity to be delivered. It is therefore possible to use infinite delivery dates. Such dates are particularly well suited for sources of goods and services of a non-seasonal type, such as software products, film development services, etc. Nonetheless, it may be beneficial to retain normal delivery dates for sources of goods and services of a seasonal or periodic nature, such as a tourist resort with different seasonal activities. In the case of futures, infinite delivery dates may be more appropriate in that such dates seem to be more useful for smooth tracking of recommendations. On the other hand, normal delivery dates are preferable for use with futures options, since such dates tend to simplify the risk analysis for the seller of the option, and therefore may increase trading volume. It should be noted that one can combine the use of futures having infinite delivery dates with futures options having normal delivery dates, although sellers of the options may find it harder to hedge properly.

An analysis of the performance of an example recommendation process in accordance with the invention will now be described. The analysis is carried out for a particular source of a designated good or service. Let x denote the number of clients that the source has per time unit, and y the total number of available clients per time unit, such that the market share of the source is given by x/y. In addition, let $\delta$ be the average perceived overvaluation of an associated future by consumers and investors comparing it to other source of the designated good or service. Finally, let $\in$ be the actual amount of overvaluation of its future caused by investment of the source itself. Both $\delta$ and $\in$ are assumed to be fractions larger than one, although a similar analysis can be made for situations in which values of $\delta$ and $\in$ are less than one, that is, the future depreciates over time.

The following additional assumptions are made in this analysis:

1. The number of "eyeballs" a future receives per time unit is $E=c_1 x+c_2 y$, where $c_1$ and $c_2$ are constants.

2. The trading volume of a future on average is proportional both to its perceived overvaluation $\delta$ and to the number of eyeballs E. More particularly, it is assumed that the volume is $V=\delta E$.

3. The average investor perceives the investment opportunity as a fraction v of the real cost discrepancy, i.e., $\delta=v\in$.

4. The market is rational in that the common investor tries to maximize his or her financial benefit.

It should be noted that these assumptions are included as part of the example, and are not requirements of the invention.

It is possible to determine the financial loss per time unit of a cheater, i.e., one attempting to undermine the recommendation system by providing false or otherwise inaccurate inputs. The cost of improving the ranking of a source by buying of its futures is the cost of the volume of futures traded by the cheater. Thus, the cheater's financial loss per time unit is $L=\in V$ which based on assumption 2 may be rewritten as $L=\in\delta E$. Using assumption 3, this result can be further rewritten as $L=v\in^2 E$, which according to assumption 1 is $L=v\in^2 (c_1 x+c_2 y)$. The ratio of the cost L taken per customer x provides the average support spending per customer (in a steady state).

Figure 8:
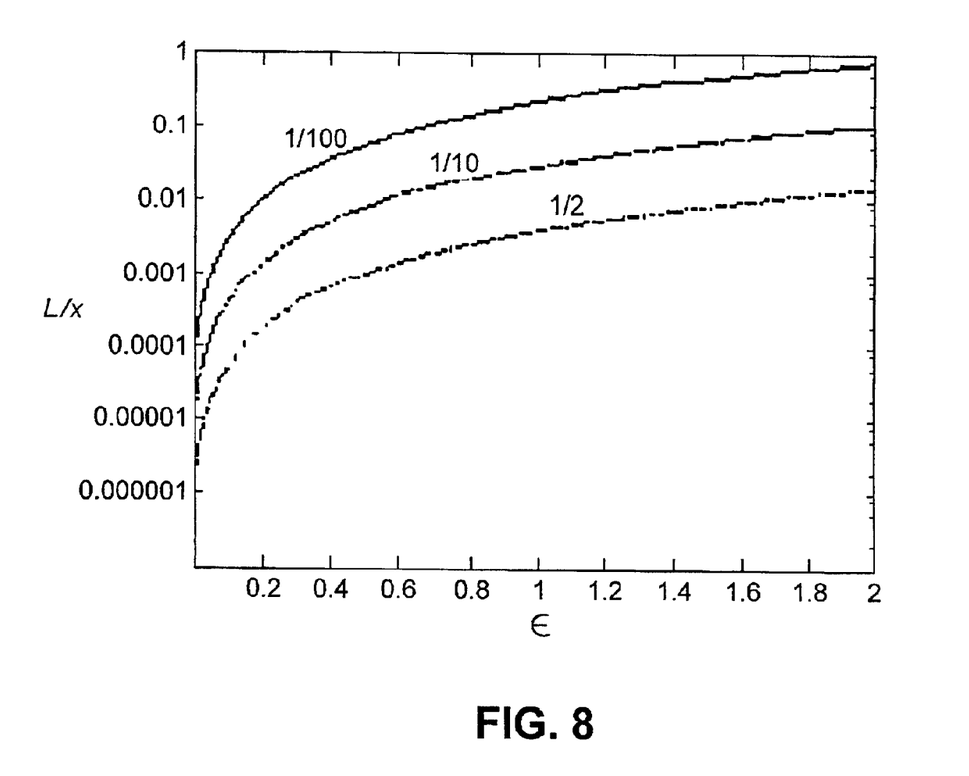
FIG. 8 shows a plot of support spending cost per customer as a function of overvaluation of a source future price caused by investment of the source itself in an illustrative embodiment of the invention.

FIG. 8 shows a plot of the ratio L/x as a function of the discrepancy $\in$, using $(c_1, c_2, v)=(1/100, 1/500, 0.9)$ as possible values, for market shares (i.e., ratios x/y) of 1/100, 1/10 and 1/2. Each curve in the plot corresponds to one of the three different market shares. It can be seen that in this example the losses increase rapidly with the distortion of the futures value. In addition, the overhead associated with cheating increases with market share. This is desirable in that larger sources are more likely to be carefully audited, and therefore less likely to even attempt cheating on the recommendation futures market.

It should be noted that the costs should be viewed in relation to the anticipated profits per time unit stemming from the improved rating. However, one must also consider alternative ways of obtaining this better rating, such as advertising or improving the goods or services. The recommendation system is abuse-free if these latter costs are lower than those of support-buying futures.

The secure recommendation techniques in the illustrative embodiments described above provide a number of significant advantages over conventional techniques. For example, the recommendations are abuse-free in that they reflect the actual impressions of users, and do not allow deceitful bias to be introduced by sources with a stake in the outcome of the recommendation. More particularly, a recommendation system in accordance with the invention may be configured such that attempts at manipulating the recommendation mechanism are less effective and more costly than other ways of getting improved ratings, such as advertisements or improved service. The resulting recommendations are thus secure against "biased buying" by parties interested in thwarting the recommendation outcome.

Another advantage is that the resulting recommendations reflect user opinions in a timely manner, i.e., a given recommendation is representative of recent performance and perception. The invention provides economic incentives to ensure this timeliness.

Yet another advantage is that the recommendations can be provided at very low cost. The illustrative embodiments do not require excessive computational or memory resources, and can be readily implemented in conjunction with mobile client devices. In addition, the costs associated with generating the recommendations may be at least partially defrayed by trading fees.

It should be understood that the above-described embodiments of the invention are illustrative only.

For example, as noted above, the invention can be implemented using other types of financial instruments, such as stocks. More particularly, it is possible to create a stock associated with the perception of each source of goods or services. However, stocks have the drawback of being generally less volatile than other financial instruments, which may result in less timely recommendations. Also, the lower profits achievable by stocks may make the recommendation less accurate even in a hypothetical stable state of the system. Finally, stocks generally offer less flexibility than the futures and futures options used in the above-described illustrative embodiments.

In addition, the secure recommendations generated by the invention can be used for other purposes, such as directed advertisements, and research on demographics and consumer behavior.

Furthermore, the invention can be applied to other types of information processing systems and corresponding arrangements of client and server devices. The particular processes utilized in a given embodiment may vary depending upon application-specific factors such as the configuration and capabilities of the client and server devices, etc.

These and numerous other alternative embodiments within the scope of the following claims will be apparent to those skilled in the art.

What is claimed is:

1. A computer-implemented method for generating a recommendation for one or more sources of goods or services in an information processing system, wherein the method comprises the steps of:

determining prices of financial instruments characterizing opinions regarding a plurality of sources of goods or services, each of the financial instruments being associated with a corresponding one of the sources and indicating one or more bets placed regarding performance of that source; and generating, using a computer, a recommendation for at least a particular one of the plurality of sources of goods or services based at least in part on a comparison of the determined price associated with the particular one of the sources of goods or services with one or more of the determined prices associated with others of the plurality of sources of goods or services.

2. The method of claim 1 wherein the financial instruments comprise at least one of futures and futures options.

3. The method of claim 1 wherein the prices of the financial instruments are established in accordance with a market established for the financial instruments based on inputs from investors placing bets regarding performance of the sources.

4. The method of claim 1 wherein the prices of the financial instruments are determined based on bets received in one or more servers of the system from user interfaces associated with one or more client devices of the system.

5. The method of claim 1 wherein a given one of the bets placed regarding performance of the particular one of the sources is placed by a user selecting purchase of the corresponding financial instrument in a user interface associated with a client device of the system.

6. The method of claim 1 wherein the recommendation comprises a presentation of a ranking of at least a subset of the plurality of sources from a best one of the subset of the sources to a worst one of the subset of sources.

7. The method of claim 1 wherein associated with the recommendation is a certainty indicator specifying the strength of the recommendation based on degree of difference between the determined price of a financial instrument associated with particular one of the sources and determined prices of financial instruments associated with one or more of the other sources.

8. The method of claim 1 wherein the plurality of sources of goods or services is organized into a plurality of classes each including one or more subclasses.

9. The method of claim 1 wherein a user enters a request for the recommendation via a client device of the system.

10. The method of claim 1 wherein a user request for the recommendation comprises a designation of a class of the sources and at least one subclass of the designated class.

11. The method of claim 1 wherein a user request for the recommendation comprises a designation of a class of the sources, and further wherein the system automatically determines each of a plurality of subclasses associated with the designated class, determines prices of the financial instruments for each of the subclasses, and generates the recommendation in the form of a ranking of the sources for each of the subclasses.

12. The method of claim 1 wherein a user request for the recommendation comprises a designation of a class of the sources, and further wherein the user ranks a plurality of subclasses associated with the designated class in order of importance, the system automatically assigns weights to each of the subclasses based on the user rankings, prices of financial instruments are determined for each of the subclasses, the prices are weighted using the assigned weights, the weighted prices are summed for each of the subclasses, and the recommendation is presented to the user in the form of a ranking of the sources based on the sums of the weighted prices.

13. An apparatus for use in generating a recommendation for one or more sources of goods or services in an information processing system, the apparatus comprising:

a processor-based client device adapted for connection via a network to one or more servers of the system, the client device being operative to determine prices of financial instruments characterizing opinions regarding a plurality of sources of goods or services, each of the financial instruments being associated with a corresponding one of the sources and indicating one or more bets placed regarding performance of that source; and to generate a recommendation for at least a particular one of the plurality of sources of goods or services based at least in part on a comparison of the determined price associated with the particular one of the sources of goods or services with one or more of the determined prices associated with others of the plurality of sources of goods or services.

14. An apparatus for use in generating a recommendation for one or more sources of goods or services in an information processing system, the apparatus comprising:

a set of one or more servers adapted for connection via a network to one or more client devices of the system, the one or more servers being operative to determine prices of financial instruments characterizing opinions regarding a plurality of sources of goods or services, each of the financial instruments being associated with a corresponding one of the sources and indicating one or more bets placed regarding performance of that source; and to generate a recommendation for at least a particular one of the plurality of sources of goods or services based at least in part on a comparison of the determined price associated with the particular one of the sources of goods or services with one or more of the determined prices associated with others of the plurality of sources of goods or services.

15. An article of manufacture comprising a computer-readable medium having embedded therein one or more software programs for use in generating a recommendation for one or more sources of goods or services in an information processing system, wherein the one or more software programs when executed by one or more processor-based devices of the system implement the steps of:

determining prices of financial instruments characterizing opinions regarding a plurality of sources of goods or services, each of the financial instruments being associated with a corresponding one of the sources and indicating one or more bets placed regarding performance of that source; and generating a recommendation for at least a particular one of the plurality of sources of goods or services based at least in part on a comparison of the determined price associated with the particular one of the sources of goods or services with one or more of the determined prices associated with others of the plurality of sources of goods or services.

* * * * *